United States Patent
Solberg et al.

(10) Patent No.: US 9,930,876 B2
(45) Date of Patent: Apr. 3, 2018

(54) SIDE PLANING BOBBER

(71) Applicants: Dean Carl Solberg, Minot, ND (US); Debra Lynn Sebastian, Hazen, ND (US)

(72) Inventors: Dean Carl Solberg, Minot, ND (US); Debra Lynn Sebastian, Hazen, ND (US)

( * ) Notice: Subject to any disclaimer, the term of this patent is extended or adjusted under 35 U.S.C. 154(b) by 0 days.

(21) Appl. No.: 14/999,243

(22) Filed: Apr. 14, 2016

(65) Prior Publication Data
US 2017/0295769 A1    Oct. 19, 2017

(51) Int. Cl.
*A01K 91/08* (2006.01)
*A01K 93/00* (2006.01)

(52) U.S. Cl.
CPC .............. *A01K 93/00* (2013.01); *A01K 91/08* (2013.01)

(58) Field of Classification Search
CPC ....................................................... A01K 91/08
USPC ............................................. 43/43.13, 43.12
See application file for complete search history.

(56) References Cited

U.S. PATENT DOCUMENTS

| | | | | |
|---|---|---|---|---|
| 813,153 A * | 2/1906 | Johnson | .................. | A01K 93/00 43/44.88 |
| 900,139 A * | 10/1908 | Welch | .................... | A01K 91/08 43/43.13 |
| 1,361,067 A * | 12/1920 | Jordan | .................... | A01K 85/16 43/42.22 |
| 1,361,602 A * | 12/1920 | Marks | .................... | A01K 91/02 43/43.13 |
| 1,606,240 A * | 11/1926 | Klaserner | .............. | A01K 93/00 43/43.13 |
| 2,293,800 A * | 8/1942 | Brown | .................... | A01K 93/00 43/4 |
| 2,597,288 A * | 5/1952 | Caldwell | ................ | A01K 93/00 43/43.12 |
| 2,608,017 A * | 8/1952 | Hinkson | ................ | A01K 95/00 43/43.12 |
| 2,798,331 A * | 7/1957 | Westdahl | ............... | A01K 93/00 43/43.13 |
| 2,883,787 A * | 4/1959 | Dahl | ....................... | A01K 85/16 43/43.13 |
| 2,920,414 A * | 1/1960 | Koepplin | ............... | A01K 93/00 43/43.13 |
| 2,923,085 A * | 2/1960 | Dahl | ....................... | A01K 91/08 43/43.13 |
| 2,933,848 A * | 4/1960 | Tollefson | ............... | A01K 91/08 43/43.13 |
| 2,957,267 A * | 10/1960 | Dempsey | ............... | A01K 95/00 43/43.12 |
| 3,003,277 A * | 10/1961 | Vann | ..................... | A01K 93/00 43/43.13 |
| 3,099,099 A * | 7/1963 | Cahen | .................. | A01K 91/065 43/43.13 |
| 3,134,189 A * | 5/1964 | Hubbart | ................ | A01K 91/08 43/43.13 |

(Continued)

FOREIGN PATENT DOCUMENTS

FR    2985412 A1 * 7/2013
KR    20010054091 A * 7/2001

*Primary Examiner* — Darren W Ark

(57) ABSTRACT

The prospective invention is a side planing bobber when attached to the users fishing line the invention will side plane out to the right or left from a straight line on a surface of water when trolling by the user.

4 Claims, 1 Drawing Sheet

(56) References Cited

U.S. PATENT DOCUMENTS

| | | | | |
|---|---|---|---|---|
| 3,145,498 | A * | 8/1964 | Kochis | A01K 91/06 43/43.13 |
| 3,153,298 | A * | 10/1964 | Lemon | A01K 85/14 43/43.13 |
| 3,156,065 | A * | 11/1964 | Klammer | A01K 97/00 43/43.13 |
| 3,181,266 | A * | 5/1965 | Lenfvenius | A01K 91/06 43/43.13 |
| 3,464,142 | A * | 9/1969 | Hubbart | A01K 91/08 43/43.13 |
| 3,747,248 | A * | 7/1973 | Baer | A01K 91/06 43/43.13 |
| 3,760,762 | A * | 9/1973 | Spongberg | A01K 91/08 43/43.13 |
| 3,818,624 | A * | 6/1974 | Duffy | A01K 91/08 43/43.13 |
| 3,971,153 | A * | 7/1976 | Harms | A01K 91/06 43/43.13 |
| 4,461,115 | A * | 7/1984 | Carrillo | A01K 91/06 43/43.13 |
| 4,561,205 | A * | 12/1985 | Kessler | A01K 93/00 43/44.87 |
| 4,763,437 | A * | 8/1988 | Cuda | A01K 91/06 43/43.13 |
| 4,879,834 | A * | 11/1989 | Bohme | A01K 91/08 43/43.12 |
| 4,920,689 | A * | 5/1990 | Anderson | A01K 91/08 43/43.13 |
| 4,944,107 | A * | 7/1990 | Wymore | A01K 95/00 43/44.89 |
| 5,165,196 | A * | 11/1992 | Spickelmire | A01K 91/08 43/43.13 |
| 5,185,951 | A * | 2/1993 | Hemmerle | A01K 91/08 43/43.13 |
| 5,355,615 | A * | 10/1994 | Spickelmire | A01K 91/08 43/43.13 |
| 5,435,094 | A * | 7/1995 | Howard | A01K 91/08 43/43.13 |
| 5,636,467 | A * | 6/1997 | Adams | A01K 91/08 43/43.13 |
| 5,867,932 | A * | 2/1999 | Reiger | A01K 91/08 43/43.13 |
| 5,875,583 | A * | 3/1999 | Church | A01K 91/08 43/43.13 |
| 6,256,924 | B1 * | 7/2001 | Walker | A01K 91/08 43/43.13 |
| 6,412,215 | B1 * | 7/2002 | Even | A01K 91/08 43/43.13 |
| 7,213,363 | B2 * | 5/2007 | Lieb | A01K 93/00 43/43.13 |
| 7,380,366 | B1 * | 6/2008 | Barrow | A01K 91/08 43/43.13 |
| 7,578,092 | B2 * | 8/2009 | Spickelmire | A01K 91/08 43/43.13 |
| 7,971,386 | B2 * | 7/2011 | Garrett | A01K 91/08 43/43.13 |
| 8,448,375 | B1 * | 5/2013 | Blankenship | A01K 93/00 43/43.13 |
| 8,496,507 | B2 * | 7/2013 | Poston | B63C 9/04 441/80 |
| 2002/0095851 | A1 * | 7/2002 | Petry | A01K 91/08 43/4.5 |
| 2006/0254120 | A1 * | 11/2006 | Sugiyama | A01K 91/08 43/43.13 |
| 2008/0022580 | A1 * | 1/2008 | Moulder | A01K 91/08 43/43.13 |
| 2008/0313949 | A1 * | 12/2008 | Lee | A01K 91/08 43/43.13 |
| 2010/0058641 | A1 * | 3/2010 | Lee | A01K 91/08 43/43.13 |
| 2012/0055072 | A1 * | 3/2012 | Rankin | A01K 91/08 43/43.13 |
| 2015/0366178 | A1 * | 12/2015 | Bechhold | A01K 91/08 43/17.6 |

\* cited by examiner

SIDE PLANING BOBBER

BACKGROUND OF THE INVENTION

This invention relates to the sport of fishing when trolling by a user. When utilizing a regular known and used bobber for trolling, the bobber and fishing line stay in a straight line of travel behind the user and boat. If two or more fishing lines are used in this manner, they often become entangled because of their proximity to each other, and because of the foregoing, the only area being trolled is behind the user. Therefore, no area of any distance out to the side of the user is being utilized. Hence, the area being covered while trolling is limited to and by the user. Therefore, there is a need and use for this invention.

DESCRIPTION OF THE PRIOR ART

Bobbers for fishing have been used for years. Typically, a conventional bobber, when attached to fishing line, is used at or from a stationary location and occasionally in the mode of trolling. While these bobbers may be suitable for the purpose they address, they are not suitable for the purpose this prospective invention addresses.

SUMMARY OF THE INVENTION

In view of some of the disadvantages in bobbers of prior art, this invention has a much better way of presenting the bait or lure when trolling by the user. Because of the inventions ability to side plane outward from a straight line, and out to the side of the user or users when trolling, and not be limited to just the area behind the boat and user. Therefore, a larger area to be fished by trolling is made available and can be utilized. The line eyelets are made so the invention can be installed or removed without having to cut or separate the fishing line. The invention is held in place on the fishing line by a line clamp. Here as outlined rather broadly, the function and use of the prospective invention and will be more detailed in the hereafter drawings and claims.

BRIEF DESCRIPTION OF THE DRAWINGS

An explanation of the drawings in which similar characters denote similar elements throughout the several views.

DETAILED DESCRIPTION

Figure 1:
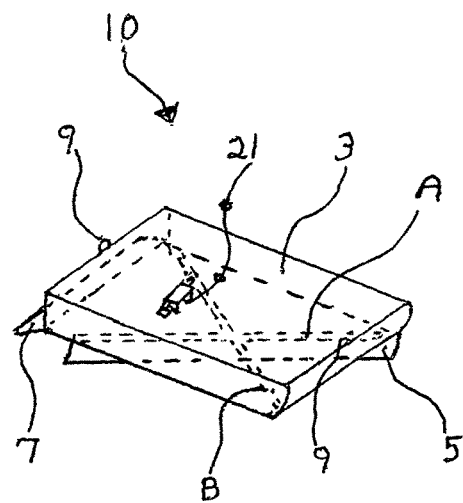
FIG. 1 is a perspective top angle view showing a first configuration of the present invention where the planing blades are inserted into blade slots A.
Figure 2:
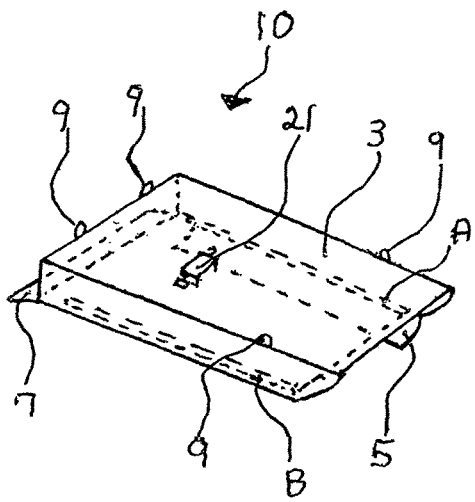
FIG. 2 is a perspective top angle view showing a second configuration of the present invention where the planing blades are inserted into blade slots B.
Figure 3:
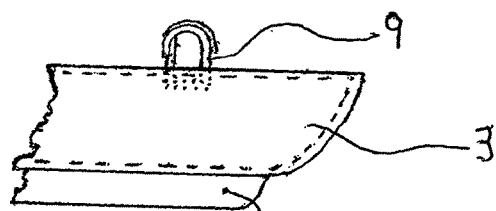
FIG. 3 is a perspective view of the planning blade.

As shown in FIGS. 1 through 3, referenced characters 5 and referenced characters 9 vary in location and number while their function and use remain the same. The flotation shell 3 is the buoyant and supporting structure to which all referenced characters are attached as shown in FIGS. 1 and 2 the term, forward or front, is to the right in all the drawings as viewed. As shown in FIG. 1, the side planing bobber 10 is installed on the fishing line, with the fishing line being installed through front split eye line eyelet 9, then to line clamp 21, and out through rear split eye line eyelet 9, where the line is attached thereafter to a fishing lure. During trolling, the water pressure acting against planing blade 5 will cause an outward deflection of the bobber 10 and fishing line, and at the same time, the upward water pressure against planing flap 7 will compensate for the weight and water drag of a fishing lure, and keep the bobber on a level plane with the water surface. This same water pressure against the canted front of the floatation shell 3 on planing bobber 10 (shown in detail in FIG. 5) will cause the bobber 10 to rise upwards to a level on the water surface.

Figure 6:
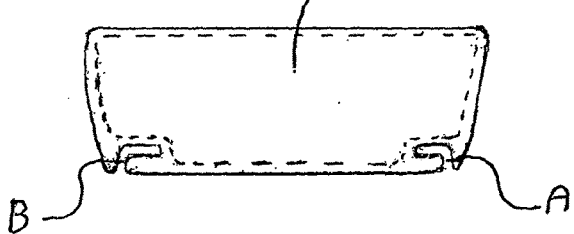
FIG. 6 is a front view of the present invention.

In FIGS. 1 and 2, the side planing bobber 10 as shown, will side plane outward to the left from a straight line. In order to have the bobber 10 side plane outward to the right from a straight line requires the user to remove planing blade 5 from blade slot A and reinstall the same in blade slot B. This can be achieved because planing blade 5 is removable and is shown in FIG. 3. FIG. 6 depicts a view of blade slots A and B as shown in a front view of flotation shell 3 of said bobber 10.

Referencing FIG. 2, should the user set the bobber 10 to plane left, the user would then thread the fishing line through the right front line eyelet 9, then to line clamp 21, then to the left rear line eyelet 9, where the line is attached thereafter to the fishing lure.

Should the user set the bobber 10 to plane right, the user would then thread the fishing line through the left front split eye line eyelet 9 on to line clamp 21, then to the right rear split eye line eyelet 9, and then out to the fishing lure. Therefore, the bobber 10 would be on the fishing line at an angle, thus creating a side planing movement when trolled by user.

Figure 4:
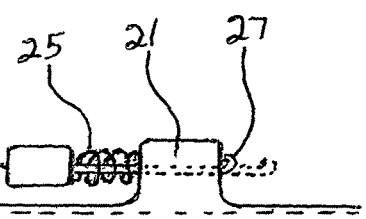
FIG. 4 is a perspective side view of the line clamp of the present invention.

In FIG. 1, reference number 21 denotes a side view of line clamp 21, as illustrated in FIG. 4 and is shown in a closed position. Clamp rod 27 passes through clamp housing 21, through clamp spring 25, and is attached to clamp button 23. When clamp button 23 is depressed in the direction shown by arrowed lead line for reference number 23, clamp spring 25 collapses and clamp rod 27 moves out to an open position, as illustrated by dotted lines shown in FIG. 4.

Figure 5:
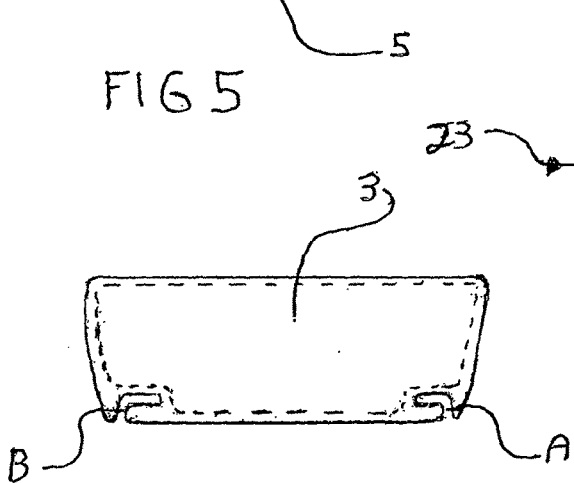
FIG. 5 is a perspective side view of the split eye line eyelets on the present invention.

FIG. 5 is a side view of split eye line eyelets 9 and how the split eye line eyelets appear and are installed on the side planing bobber 10. In FIG. 5 as shown, the upper split eye line eyelet 9, with the arrow, is to indicate where the fishing line can be slid down between the two half loops of the split eye line eyelet when installing the bobber to the fishing line by the user. To remove the bobber 10 from the fishing line by the user, the fishing line is slid up and out from between the two half loops of the split eye line eyelet 9, therefore the side planing bobber 10, can be installed anyplace on the fishing line without having to cut or sever the fishing line.

With respect to the above description then, it is to be realized then, for the parts of the invention, to include variations in size, materials, shape, form, function, and manner of operation, assembly, and use. Therefore, there is no desire to limit the invention to the exact construction and operation shown and described, all suitable modifications may be resorted to, falling within the scope of the invention.

We claim:

1. A side planing bobber comprising:
   a buoyant floatation shell comprising:
      a front end, a rear end, a top surface, a bottom surface, and a longitudinal axis defined between the front and rear ends, the front end being a canted front end, the floatation shell having a rectilinear shape, a plurality of planing blade slots extending into the bottom surface, the plurality of planing blade slots having lengths which extend in a configuration chosen from one of transverse to the longitudinal axis and parallel to the longitudinal axis;

a removable planing blade, the planing blade can be inserted into one of the slots of the plurality of planing blade slots;

a planing flap extending rearwardly and downwardly from the rear end at an angle relative thereto, wherein the planing flap compensates for a weight and drag of a fishing lure to be connected to the bobber via a fishing line;

a line clamp for holding the bobber at a desired position along the fishing line, the line clamp located on the top surface, the line clamp comprising:
   a clamp housing extending upwardly from the top surface,
   a clamp rod slidably extending through the clamp housing, the clamp rod having first and second ends, the first end of the clamp rod extending on one side of the clamp housing and the second end of the clamp rod extending on an opposing side of the clamp housing,
   a clamp button on the first end of the clamp rod and capable of being grasped by a user to open the line clamp for receiving the fishing line and when released allows the line clamp to close to engage the fishing line, and the second end of the clamp rod being curved and which is configured to engage the fishing line,
   a clamp spring for biasing the clamp button away from the clamp housing and for biasing the second end of the clamp rod toward the clamp housing, the clamp spring disposed on the clamp rod between the clamp housing and clamp button; and a plurality of split eye line eyelets on the top surface and extending upwardly therefrom, the split eye line eyelets located along at least one edge of the rectilinear shape of the floatation shell, each of the split eye line eyelets made from a single length of material and comprising:
   a horizontal base with first and second opposing ends,
   left and right vertical portions extending upwardly from the first and second opposing ends respectively,
   left and right curved portions extending from the left and right vertical portions respectively, the left and right curved portions being adjacent one another and extending in opposite directions to each other, the left and right curved portions having terminal ends which extend toward the right and left vertical portions respectively and downwardly toward the horizontal base, wherein the fishing line can be inserted between the left and right curved portions and then moved into a space which is bounded by the horizontal base, left and right vertical portions, and left and right curved portions so as to retain the fishing line therein.

2. The side planing bobber of claim 1, wherein the buoyant floatation shell is hollow.

3. The side planing bobber of claim 1, wherein the planing blade is insertable into and removable from one of the plurality of planing blade slots so as to allow adjustment of the outward direction of deflection of the bobber.

4. The side planing bobber of claim 1, wherein the line clamp is located on the top surface between the split eye line eyelets.

\* \* \* \* \*